United States Patent

[11] 3,616,196

[72] Inventors George C. Sun
 Cherry Hill, N.J.;
 Theodore Shell, Swarthmore, Pa.
[21] Appl. No. 779,602
[22] Filed Nov. 27, 1968
[45] Patented Oct. 26, 1971
[73] Assignee E. I. du Pont de Nemours and Company
 Wilmington, Del.

[54] SHEETS AND LAMINATES OF RESINOUS AND FIBROUS MATERIALS
 17 Claims, No Drawings
[52] U.S. Cl. ................................................ 161/227,
 117/126 GR, 117/140 A, 117/161 P, 161/93,
 161/156, 161/158, 161/197, 260/37 N
[51] Int. Cl. .................................................... B32b 17/10,
 C08g 20/32, C08g 51/04
[50] Field of Search .......................................... 161/156,
 158, 197, 227, 93; 260/37 N, 78 TF, 32.6;
 117/115, 126 GR, 140 A, 161 P

[56] References Cited
 UNITED STATES PATENTS

| | | | |
|---|---|---|---|
| 3,179,614 | 4/1965 | Edwards | 260/30.2 |
| 3,190,856 | 6/1965 | Lavin et al. | 260/65 |
| 3,249,588 | 5/1966 | Gall | 260/65 |
| 3,312,663 | 4/1967 | Sorenson | 161/227 |
| 3,347,808 | 10/1967 | Lavin et al. | 161/192 |
| 3,371,009 | 2/1968 | Traynor et al. | 260/28 |
| 3,373,075 | 3/1968 | Fekete et al. | 260/41 |
| 3,505,168 | 4/1970 | Dumphy et al. | 260/78 |
| 3,505,295 | 4/1970 | Grunsteidl et al. | 260/78 |
| 3,536,666 | 10/1970 | Berg | 161/197 |
| 3,541,036 | 11/1970 | Libackyj | 260/78 |

Primary Examiner—John T. Goolkasian
Assistant Examiner—George W. Moxon, III
Attorney—John E. Griffiths ABSTRACT: (A) Sheets of fibrous material impregnated with a polymeric precursor of a polyimide resin, that may be partially cured if desired, wherein such polymeric precursor has inert, thermally stable, colloidal particles dispersed therein and (B) unitary polyimide laminates prepared from a plurality of such sheets.

SHEETS AND LAMINATES OF RESINOUS AND FIBROUS MATERIALS

BACKGROUND OF THE INVENTION

This invention relates to laminates and the sheets that are used to form such laminates. More particularly it relates to (a) laminates comprising a plurality of plies of fibrous sheet material impregnated with a polyimide resin and (b) sheets of fibrous material impregnated with a polymeric precursor of a polyimide resin, that may be partially cured if desired, wherein such resin and precursor have inert, thermally stable, colloidal particles dispersed therein.

There are various methods for producing laminates comprising fibrous materials and polyimide resins, but usually the preparation involves a four-step process:
1. Preparing a polymeric precursor of the imide-containing polymer;
2. Impregnating a fibrous material with the polymeric precursor;
3. Partially converting the polymeric precursor that is impregnated in the fibrous material to an imide-containing structure; and
4. Laminating and consolidating the product of (3) by application of heat and pressure and/or vacuum.

A typical method for the preparation of polyimide laminates is described in Traynor, Jr. et al., U.S. Pat. No. 3,371,009, issued Feb. 27, 1968.

Desirable characteristics of laminates of polyimide resins and fibrous materials include their resistance to degradation at high temperatures and their resistance to the passage of electrical current. However, a limitation of these products, in some applications, is that they may contain small voids dispersed throughout the resinous material. These voids may be undesirable because they may cause a reduction in the mechanical strength of the laminate they may increase the ability of the laminate to resist heat and the passage of electrical current since the voids are frequently interconnected. Furthermore, since it is difficult to control the quantity and distribution of the voids, it is very difficult to optimize the ratio of resin to fibrous material and thereby obtain maximum mechanical strength.

One method to eliminate the surface voids is described in the above-mentioned Traynor patent, wherein a thin adhesive coating is applied to the finished laminate thereby filling the surface voids. But, this method appears to be only a partial solution to the problem since the internal voids still exist despite the surface coating.

SUMMARY OF THE INVENTION

According to the present invention, there is provided (a) sheets of fibrous material impregnated with a polymeric precursor of a polyimide resin, such precursor being partially cured, if desired, and having about 0.5 percent to 30 percent by weight, based on the combined weight of the anhydride component and the amine component of the precursor, of inert, thermally stable, colloidal particles dispersed therein; and (b) a unitary polyimide laminate having low void content formed from a plurality of sheets of (a).

For some reason not fully understood, it has been found that the incorporation of the inert colloidal particles in the polyimide resin of the laminate effects a reduction in the void content of the laminate, an improvement in the thermal stability of the laminate, and an improvement in its retained flexural strength.

Simply stated, the process for preparing the improved laminate consists of preparing a composition of the colloidal particles and the polymeric precursor of the imide-containing polymer, and then using this composition to prepare a polyimide laminate. Details of the preparation will be set forth under the next heading.

DESCRIPTION OF THE PREFERRED EMBODIMENTS

1. Preparation of the polymeric precursor of the imide-containing polymer:

The earliest and best known of the precursors of the imide-containing polymers are polyamide-acids of the class defined in Edwards U.S. Pat. No. 3,179,614 issued Apr. 20, 1965. Species of such polamide-acids are described in Lavin, Markhart & Kass U.S. Pat. No. 3,190,856 issued June 22, 1965. Other species are described in Frost & Bower U.S. Pat. No. 3,179,635 issued Apr. 20, 1965, and Loncrini U.S. Pat. No. 3,182,073 issued May 4, 1965.

Another class of solvent soluble precursors are polyamide-esters. An example of this class is described in Sorenson U.S. Pat. No. 3,312,663 issued Apr. 4, 1967.

Still another class of solvent soluble precursors are polyamide-amic acids of the type described in Dutch Pat. application No. 6,400,422 (available July 22, 1964), British Pat. Specification No. 1,032,649 published June 15, 1966, and Lavin, Markhart & Santer, U.S. Pat. No. 3,260,691 issued July 12, 1966.

The disclosure of each of the above references is hereby incorporated herein in its entirety.

Some examples of polyamide-acids are those within the scope of above-mentioned U.S. Pat. No. 3,179,614. Such polyamide-acids have the recurring formula:

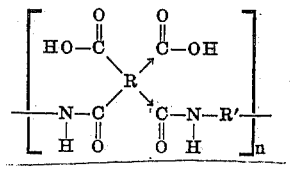

wherein ⇌ denotes isomerism (In any recurring unit the groups to which arrows point may exist in the polymeric structure as shown or these groups may exist in interchanged positions.); wherein R is an organic tetravalent radical containing at least 2 carbon atoms, no more than 2 carbonal groups of each polyamide-acid unit being attached to any one carbon atom of said tetravalent radical; wherein R' is a divalent radical containing at least 2 carbon atoms, the amide groups of adjacent polyamide-acid units each attached is an integer sufficient to provide a polamide-acid having an inherent viscosity of at least 0.01, preferably 0.3–5.0 Xas measured as a 0.5 percent by weight solution in N,N-dimethyl-acetamide at 30° C.

The process for preparing the polyamide-acid compositions are described in the above-mentioned patents. Generally, it comprises reacting by mixing at least one organic diamine having the structural formula:

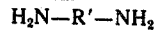

wherein R' is a divalent radical containing at least 2 carbon atoms, the two amino groups of said diamine each attached to separate carbon atoms of said divalent radical; with at least one tetracarboxylic acid dianhydride having the structural formula:

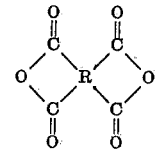

wherein R is an organic tetravalent radical containing at least two carbon atoms, no more than two carbonyl groups of said dianhydride attached to any one carbon atom of said tetravalent radical; in an organic solvent for at least one reactant, said solvent being inert to the reactants, for a time, preferably of at least 1 minute, and at a temperature below 175° C. sufficient to provide at least 50 percent of the corresponding polyamide-acid.

Among the dianhydrides which are suitable for use in the present invention are: pyromellitic dianhydride, 3,3',4,4'-diphenyltetracarboxylic dianhydride, 1,2,5,6-naphthalenetetracarboxylic dianhydride, 2,2',3,3'-diphenyltetracarboxylic dianhydride, 4,4'-isopropylidene-diphthalic anhydride, 4,4'-sulfonyldiphthalic anhydride, 3,4,9,10-perylenetetracarboxylic dianhydride, 4,4'-oxydiphthalic anhydride, 1,2,4,5-naphthalenetetracarboxylic dianhydride, 1,4,5,8-naphthalenetetracarboxylic dianhydride, 2,3,6,7-naphthalenetetracarboxylic dianhydride, 3,3'-isopropylidenediphthalic anhydride, 3,3'-ethylidene diphthalic anhydride, 4,4'-ethylidene diphthalic anhydride, 3,3'-methylene diphthalic anhydride, 4,4'-methylene diphthalic anhydride, mellophanic dianhydride, 2,3,5,6-pyrazinetetracarboxylic dianhydride, 2,3,4,5-thiophenetetracarboxylic dianhydride, 4,4'-biphthalic anhydride, 3,3'-biphthalic anhydride, 2,3,4,5-pyrrolidonetetracarboxylic dianhydride, 1,4-dimethyl-7,8-diphenylbicyclo(2.2.2)oct-7-ene-2,3,5,6-tetracarboxylic dianhydride, 1,8-dimethyl dicyclo(-b 2.2.2)oct-7-ene-2,3,5,6-tetracarboxylic dianhydride, 1,4,7,8-tetrachlorobicyclo(2.2.2)oct-7-ene-2,3,5,6,-tetracarboxylic dianhydride, 7,8-diphenylbicyclo(2.2.2)oct-7-ene-2,3,5,6-tetracarboxylic dianhydride, 1,8-dimethyldicyclo(2.2.2)oct-7-ene-2,3,5,6-tetracarboxylic dianhydride, 1,2,3,4-cyclopentanetetracarboxylic dianhydride ethylenetetracarboxylic dianhydride, 3,3',4,4'-bensophenonetetracarboxylic acid dianhydride and its position isomers, hexafluoro isopropylidene diphthalic anhydride, etc.

Among the diamines which are suitable for use in the present invention are: 4,4'-isopropylidene-dianiline, 4,4'-methylene-dianiline, benzidine, 3,3'-dichloro-benzidine, 4,4'-thiodianiline, 3,3'-sulfonyldianiline, 4,4'-sulfonyl-dianiline, 1,5-naphthalene diamine, 4,4'-(diethyl silylene) dianiline, 4,4'-(diphenyl silylene)-dianiline, 4,4'-diaminobenzophenone, 4,4'-(ethylphosphinylidene)-dianiline, 4,4'-(phenyl phosphinylidene)dianiline, 4,4'-(N-methylamino) dianiline, 4,4'-(N-phenylamino)dianiline and mixtures thereof, meta-phenylene-diamine, paraphenylene diamine, 2,6-diamino-pyridine, 4,4'-methylenedicyclohexylamine, hexamethylene diamine, octamethylene diamine, nonamethylene diamine, decamethylene diamine, 1,4-cyclohexane diamine, oxydianiline. The position isomers of these compounds such as the corresponding 2,2'-diamino, 3,3'-diamino and 3,4'-diamino compounds are also useful.

Any suitable inert organic solvent can be used and many illustrative ones are disclosed in the patents referred to above. Liquids such as N,N-dimethylformamide, N,N-dimethylacetamide and N-methyl-2-pyrrolidone are preferred. Other solvents which may be used in the present invention are: N,N-diethylformamide, N,N-diethylacetamide, N,N-dimethylmethoxyacetamide, N-methylcaprolactam, dimethyl sulfoxide, N-methyl-2-pyrrolidone, tetramethyleneurea, pyridine, dimethyl sulfone, hexamethylphosphoramide, tetramethylene sulfone, formamide, N-methylformamide, butyrolactone and N-acetyl-2-pyrrolidone, ketones such as methyl ethyl ketone, nitroalkanes such as nitroethane, nitropropane, etc. The solvents can be used alone, in combinations of solvents, or in combination with poorer solvents such as benzene, benzonitrile, dioxane, xylene, toluene and cyclohexane.

2. Preparing a composition of the polymeric precursor having colloidal particles dispersed therein.

Suitable materials for admixing with the polymeric precursor of the imide-containing polymer include colloidal particles of the following materials: carbon black, polyimide molding powder such as, for example, described in Gall, U.S. Pat. No. 3,249,588 issued May 3, 1966, barium titanate, potassium titanate, magnesium sulfate, titanium dioxide, asbestos, magnetic iron oxide ($Fe_3O_4$), ferric oxide ($Fe_2O_3$), aluminum powder, potassium sodium tartrate, ammonium dihydrogen phosphate, nonabrasive amorphous alumina and nonabrasive amorphous silica as in glass microballoons, preferably barium titanate. The class of nonabrasive silica also includes the various forms of "Ludox" colloidal silicas; "Celite" diatomaceous silica (Largely $SiO_2$, plus $Al_2O_3$, $Fe_2O_3$, $TiO_2$, CaO and MgO); Synthamica (a synthetic mica made from a stoichiometric ratio of $SiO_2$, $Al_2O_3$, MgO, potassium silica fluoride and potash feldspar); "Hi-Sil" silica (a hydrated silica of high purity and very fine particle size); "Cab-O-Sil" colloidal silica; and sepiolite (meerschaum; a hydrated magnesium silicate). Some forms of nonabrasive alumina are bochmite (a form of bauxite, $Al_2O_3H_2O$); "Celite" diatomaceous silica (see above); and "Bentone" 18 (a magnesium/calcium/aluminum/silicon complex oxide attached electrovalently to an organic ammonium cation).

Colloidal silica has been found to be especially useful in the practice of this invention. These particles are characterized by having essentially spherical shape, particle diameter below 0.1 micron, and a surface area of 200 to 300 square meters per gram.

However, particles having large deviations from the general characteristics of colloidal particles probably will not produce useful results. For example, when Bentonite clay particles, which are platelets 0.05 to 1.0 micron wide by about 0.003 micron thick, were admixed with the precursor solution and a laminate formed therefrom, it was found that no appreciable reduction in voids resulted.

The proportion of inert, thermally stable, colloidal particles will ordinarily be at least about 0.5 percent by weight based on the combined weight of the anhydride component and the amine component of the polymeric precursor and no reason is seen at the present time to exceed about 20 percent. Usually proportions below about 12 percent and preferably in the range of 5 to 10 percent provide satisfactory results when a balance of factors are considered, including reduction of void content, increased thermal stability and increased retained flexural strength at elevated temperatures.

These ranges are not intended to be limiting, but are merely suggestive. Thus, those skilled in the art will recognize, that for any particular polyimide resin, more or less than the above suggested proportions may be required to obtain the particular laminate qualities that are desired.

The precursor may be admixed with the particles or the particles may be admixed with the precursor at any stage in the preparation of the precursor. For example, the particles may be admixed with the solution in the organic solvent of one or both of the reactants before, during or after the formation of the precursor, or the particles may be admixed with the organic solvent prior even to the introduction of the reactants of the precursor. Preferably, the particles are admixed with a solution of the precursor.

Suitable methods of mixing the polymeric precursor and the colloidal particles include normal and high speed stirring, sand milling as for example is described in Hochberg U.S. Pat. No. 2,581,414 issued Jan. 8, 1952 and Hochberg and Bosse U.S. Pat. No. 2,855,156 issued Oct. 7, 1958, ball milling, two roll milling, other methods used in the preparation of pigment dispersions, etc. 3. Impregnating a Fibrous Material with the composition of 2.

Materials suitable for resin impregnation include No. 104, No. 108, No. 112 and No. 116 weave glass fabric; heavier grades of glass fabric such as, for example No. 181 weave; glass cloth wherein the yarn is not twisted and plied, such as No. 7721 glass cloth; glass sheets prepared from parallel glass fibers; glass fibers; asbestos fibers and sheets prepared from such fibers, and similar fibers and sheets prepared therefrom.

Any suitable method can be used to impregnate the fibrous material. For example, the fibrous material can be coated with the particle-precursor composition or it can be immersed in such composition.

4. Partially converting the polymeric precursor that is impregnated in the fibrous material to an imide-containing structure.

Often, the precursor is of such viscosity that it is tacky or sticky, thus making it difficult to store and handle the impregnated sheets. Therefore, it may be desirable to remove some of the solvent that may be present and to partially cure, i.e., partially convert the impregnated precursor to an imide-containing structure, so that the sheet will be less sticky or tacky. This removal of solvents and conversion may be by heat or any of the other methods described in the above-mentioned patents. Usually such partially cured sheets will be about 5 percent to about 99.5 percent converted to a polyimide resin. Preferably, these sheets will be about 90 to about 99.5 percent converted.

Such partially cured sheets are useful since they can be sold to processors who will then convert them into laminates.

5. Laminating and consolidating the product of (4) by application of heat, and pressure, and/or vacuum.

Any suitable method can be used for laminating the impregnated sheets. Usually, this involves the simultaneous application of heat or other means to fully convert the precursor that is impregnated in the fibrous sheet to a polyimide resin, pressure to consolidate the individual sheets into a unitary laminate, and vacuum, if desired, to draw off volatiles that are evolved during the final conversion of the precursor to the polyimide resin.

The invention will be more clearly understood by referring to the examples which follow. All parts are by weight unless otherwise indicated.

EXAMPLE 1

19.8 grams of metaphenylene diamine was dissolved in 200.5 grams of solvent having a composition of 75 parts N-methyl pyrrolidone and 25 parts xylene. Benzophenonetetracarboxylic acid dianhydride in the amount of 31.4 grams, was added portion-wise with agitation, the temperature being maintained at less than 50° C.

3.6 grams "Cab-O-Sil" (trade mark of the Cabot Corporation) colloidal silica was then admixed with the precursor solution.

Following this, the composition of the colloidal particles and the precursor solution was used to saturation-coat 112-style fiberglass cloth by immersing the cloth, under tension, in the polymeric precursor solution at room temperature, withdrawing the wetted cloth from the solution, and then pulling the wetted cloth between a pair of parallel, closely-adjacent, wire-wound rods to remove excess solution from both sides of the cloth. The spacing of the rods was adjusted to obtain a resin solids content in the prepreg, when fully cured, of about 72 percent.

The impregnated cloth was then partially cured by passing it through a drying tower at constant linear velocity in which the cloth was contacted by air at 200°–550° F. flowing under forced convection. The velocity of the cloth, the air velocity and the air temperature were regulated so that the partially-cured prepreg discharged from the tower had a total volatiles content (as determined by heating for 2½ minutes at 750° F.) of about 5 weight percent.

An eight-ply laminate was then made using the following technique:

a. Lay up was inserted in a cold press (may be up to 200° F.).
b. 1500 pounds per square inch pressure was applied and temperature was increased to 550° F. This temperature and pressure were then held for 30 minutes.
c. The pressure was released and then reapplied to 75 pounds per square inch.
d. The temperature was increased to 600° F. followed by an increase in pressure to 1,500 pounds per square inch. This temperature and pressure were then maintained for 30 minutes.
e. The laminate was cooled to about 200° F. holding the 1,500 pounds per square inch. The finished laminate was then removed from the press.

The finished laminate was found to have the following properties.

Void content — 5 percent
Flexural strength at room temperature — 37.5
(thousands of pounds per square inch)
Flexural strength at — 25.9
500° F.
(thousands of pounds per square inch)

Coefficient of thermal expansion at 50 to 250° C. (inches/inch/° C.)
Flat direction — $2.2 \times 10^{15}$
Thickness direction — $7.7 \times 10^{15}$

EXAMPLE 2

Example 1 was repeated without the addition of colloidal silica. The laminate was found to be severely blistered, porous and cracked and had poor interlaminar adhesion.

EXAMPLE 3

The procedure of Example 1 may be repeated using the same solvent of Example 1, metaphenylene diamine, sulfone diphthalic anhydride, and "Cab-O-Sil" colloidal silica to produce a laminate having properties similar to those of Example 1.

EXAMPLE 4

The procedure of Example 1 may be repeated using the same solvent of Example 1, metaphenylene diamine, hexafluoro isopropylidene diphthalic anhydride, and "Cab-O-Sil" colloidal silica to produce a laminate having properties similar to those of Example 1.

EXAMPLE 5

The procedure of example 1 may be repeated using the same solvent of Example 1, oxydianiline, methylene diphthalic anhydride, and "Cab-O-Sil" colloidal silica to produce a laminate having properties similar to those of Example 1.

EXAMPLE 6

Laminates having properties similar to those described above can be produced using the procedure of Example 1 and using carbon black or a polyimide molding powder as an additive.

The invention claimed is:

1. A sheet of fibrous material impregnated with a polymeric precursor of a polyimide resin such precursor having from about 0.5 percent to about 20 percent by weight, based on the combined weight of the anhydride component and the amine component of the precursor, of inert, thermally stable, colloidal particles dispersed therein, said particles being selected from the group consisting of polyimide molding powder, barium titanate, potassium titanate, magnesium sulfate, asbestos, magnetic iron oxide, potassium sodium tartrate, ammonium dihydrogen phosphate, nonabrasive amorphous alumina, and nonabrasive amorphous silica.

2. A sheet of fibrous material as in claim 1 wherein said polymeric precursor is partially cured to a polyimide resin.

3. A sheet of fibrous material impregnated with a partially cured polymeric precursor of a polyimide resin, such precursor having from about 3 percent to about 12 percent by weight, based on the combined weight of the anhydride component and the amine component of the precursor, of inert, thermally stable, colloidal particles dispersed therein.

4. A sheet of fibrous material as in claim 3 wherein said inert, thermally stable, colloidal particles are silica.

5. A sheet of fibrous material as in claim 3 wherein said polymeric precursor is the reaction product of benzophenonetetracarboxylic acid dianhydride and metaphenylene diamine and said inert, thermally stable, colloidal particles are colloidal silica.

6. A sheet of fibrous material as in claim 1 wherein said polymeric precursor is fully cured to a polyimide resin.

7. A reinforced resinous laminate having low void content, comprising a plurality of plies of fibrous sheet material impregnated with a polyimide resin, such resin having from about 0.5 percent to about 20 percent by weight, based on the combined weight of the anhydride component and the amine component of the resin, of inert, thermally stable, colloidal particles dispersed therein, said particles being selected from the group consisting of polyimide molding powder, barium titanate, potassium titanate, magnesium sulfate, asbestos, magnetic iron oxide, potassium sodium tartrate, ammonium dihydrogen phosphate, nonabrasive amorphous alumina, and nonabrasive amorphous silica.

8. A laminate as in claim 7 wherein said inert, thermally stable colloidal particles are present in an amount in the range from about 3 percent to about 12 percent.

9. A laminate as in claim 7 wherein said inert, thermally stable colloidal particles are present in an amount of about 7 percent to 8 percent.

10. A laminate as in claim 7 wherein said inert, thermally stable particles are colloidal silica.

11. A laminate as in claim 8 wherein said inert, thermally stable particles are colloidal silica.

12. A laminate as in claim 9 wherein said inert, thermally stable particles are colloidal silica.

13. A laminate as in claim 7 wherein said polyimide resin is formed from a polymeric precursor having the formula:

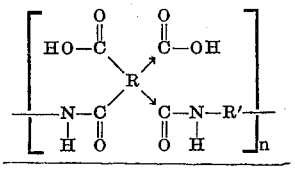

wherein → denotes isomerism; wherein R is a tetravalent organic radical containing at least 2 carbon atoms, no more than 2 carbonyl groups of each polyamide-acid unit being attached to any one carbon atom of said tetravalent radical, wherein R' is a divalent radical containing at least two carbon atoms, the amide groups of said adjacent polyamide-acid units each attached to separate carbon atoms of said divalent radical; and wherein n is an integer sufficient to provide an inherent viscosity of at least 0.1.

14. A laminate as in claim 7 wherein said polyimide resin is formed from a polymeric precursor that is the reaction product of an aromatic primary diamine containing from six to 16 carbon atoms with the dianhydride of an acid selected from the group consisting of 2,2',3,3'-, 2,3,3',4'-3,3',4,4'-benzophenonetetracarboxylic acids and mixtures thereof.

15. A laminate as in claim 7 wherein said polyimide resin is formed from a polymeric precursor that is formed by reaction of primary aromatic diamines with an acyl halide derivative of trimellitic anhydride with at least one acyl halide group at the 4-position of the ring until a polymer with film forming properties is formed that has an inherent viscosity of at least 0.2 when dissolved in N,N-dimethylacetamide.

16. A laminate as in claim 7 wherein said polyimide resin is formed from a polymeric precursor having the formula:

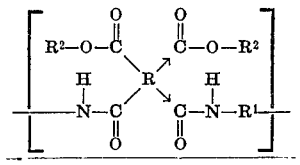

wherein the arrows denote isomerisin; R is a tetravalent radical containing at least one ring of 6 carbon atoms, said ring characterized by benzenoid unsaturation, the four carbonyl groups being attached directly to separate carbon atoms in the ring of the R radical and each pair of carbonyl groups being attached to adjacent carbon atoms in a ring of the R radical; $R^1$ is a divalent radical containing at least one ring of six carbon atoms, said ring characterized by benzenoid unsaturation, the nitrogen atoms being attached directly to separate carbon atoms in a ring of the $R^1$ radical; and $R^2$ is selected from the group consisting of alkyl and aryl; said polyamide-ester having an inherent viscosity of at least 0.1 as measured at 30° C. as a 50 percent solution in sulfuric acid.

17. A reinforced resinous laminate having low void content, comprising a plurality of plies of fibrous sheet material impregnated with a polyimide resin, such resin being the reaction product of benzophenonetetracarboxylic acid dianhydride and metaphenylene diamine, and having from about 0.5 percent to about 20 percent by weight, based on the combined weight of the benzophenonetetracarboxylic acid dianhydride and the metaphenylene diamine, of colloidal silica.